W. E. MUNTZ.
DEFLECTING SPIGOT TAP.
APPLICATION FILED MAY 10, 1917.
1,345,803.
Patented July 6, 1920.
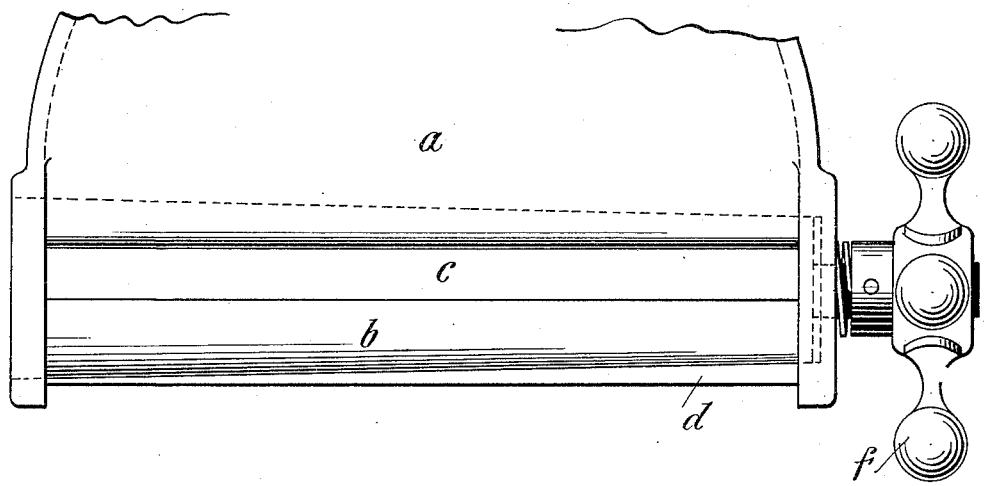
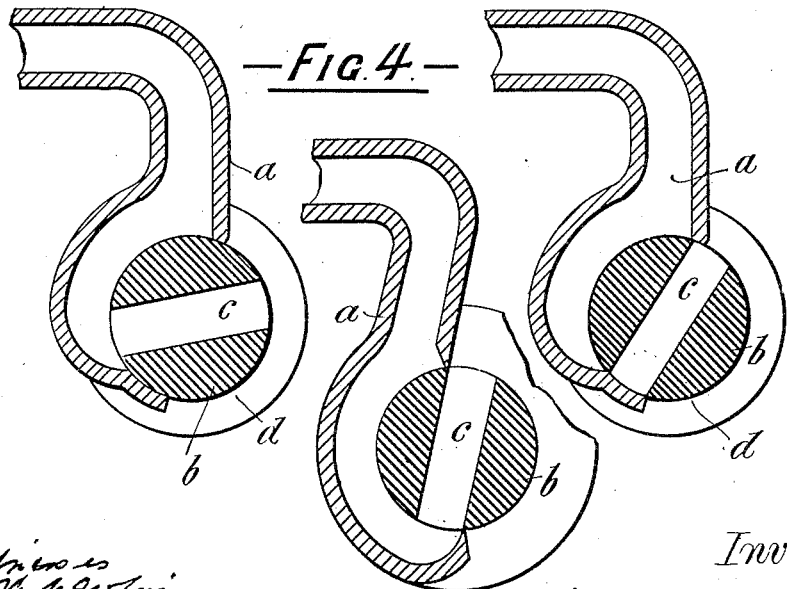

UNITED STATES PATENT OFFICE.

WILLIAM EDGAR MUNTZ, OF LONDON, ENGLAND.

DEFLECTING SPIGOT-TAP.

1,345,803.                     Specification of Letters Patent.        Patented July 6, 1920.

Application filed May 10, 1917. Serial No. 167,747.

*To all whom it may concern:*

Be it known that I, WILLIAM EDGAR MUNTZ, a subject of the King of Great Britain, and resident of 6 Bream's Buildings, Chancery Lane, London, England, have invented a new and useful Improvement in Deflecting Spigot-Taps, of which the following is a specification.

The object of the present invention is to provide a device for mechanically diverting the direction of an outflow from an orifice or for regulating the said flow or for hermetically closing the orifice when required.

The present invention consists in adapting to a widened orifice, having characteristics which I will presently specify, an elongated spigot provided with a narrow elongated slot. The elongated spigot, preferably a conical one, is seated in the orifice of the casing which is formed so that the confined fluid is permanently in contact with approximately half of the spigot, while on the discharge side the casing is cut away so as to expose an almost equal extent of its periphery leaving not more than sufficient casing to cover the slot of the spigot when the latter is turned to the exact position to cut off the discharge. Space is thus provided for rotating the spigot through a wide angle approximating to 150° for permitting the fluid to enter the slot of the spigot at the back, and the discharge to be deflected between the edges of the orifice at considerably varied inclinations, without being cut off and without interference by either of the edges.

In the accompanying drawing I have shown a tap for water embodying my invention.

Figure 1 is a front view of the tap, open,
Fig. 2 is a cross section of the same, and
Fig. 3 is a cross section similar to Fig. 2 the tap however, being closed.

I have also shown in Fig. 4 a deflector which gives a wider angle of deflection without however, being capable of cutting off the fluid.

$a$ is a nozzle in the open end of which is a spigot $b$. The spigot is pierced diametrically with a slot $c$. This slot is narrow in proportion to the length of the spigot and is considerably narrower than the mouth of the orifice $d$ of the nozzle $a$ which is expanded on one side of the spigot and cut away on the other so as to make a wide opening on the discharge side approximating 150°.

The result is that the spigot is capable of being turned by means of a handle $f$ or equivalent device, through a wide angle approximating 150° without cutting off the flow and is thus able to discharge or divert the flow from the slot $c$ in any direction within the limits permitted by the width of the orifice.

At the same time the spigot is capable of regulating the volume of discharge or of cutting it off entirely, except in the case of Fig. 4, in a way exactly similar to that of ordinary spigot taps when the spigot is turned.

The spigot is preferably a conical one ground into its circumferential casing which forms the orifice $d$ and at its ends is completely seated in the casing into which it is ground throughout its entire circumference.

The coned spigot will preferably be kept seated by a light spring preferably a spring washer inserted between the outer surface of the casing and the headed handle.

What I claim and desire to secure by Letters Patent in the United States is:—

1. A tap adapted to effect the functions described comprising, a casing having a wide, elongated discharge orifice in the outer end, a rotatable spigot plug located in said orifice, an elongated slot in the said plug, the said slot having a cross sectional area as great as the minimum cross sectional area of the supply pipe, means for rotating the said plug so as to deflect the outflowing fluid in any direction within the limits of a wide arc.

2. A tap adapted to effect the functions described comprising, a casing having a wide, elongated discharge orifice in the outer end, a rotatable spigot plug located in said orifice, an elongated slot in the said plug, the said slot having a cross sectional area as great as the minimum cross sectional area of the supply pipe, means for rotating the said plug so as to deflect the outflowing fluid in any direction within the limits of an arc of approximately 150°.

3. A tap adapted to effect the functions described comprising, a casing having its outer end gradually splayed out and flattened to form a hollow neck having a cross sectional area throughout its entire length as great as the minimum cross sectional area of the inner end of the casing, a wide, elongated outlet orifice in the side of the casing, an elongated spigot plug located in said orifice, a diametrically transverse slot extending through the plug and along its length and having a cross sectional area as great as the minimum cross sectional area of the inner end of the casing, and means for rotating the plug so as to deflect the outflowing liquid in any direction within the limits of a wide arc.

4. A tap adapted to effect the functions described comprising, a casing having its outer end gradually splayed out and flattened to form a hollow neck having a cross sectional area throughout its entire length as great as the minimum cross sectional area of the inner end of the casing, a wide, elongated outlet orifice in the side of the casing, an elongated, conical spigot plug located in the said orifice with its periphery forming a fluid tight joint therewith, a diametrically transverse slot extending through the plug and along its length and having a cross sectional area as great as the minimum cross sectional area of the inner end of the casing, and means for rotating the plug so as to deflect the outflowing fluid in any direction within the limits of a wide arc.

5. A tap adapted to effect the functions described comprising, a casing having its outer end gradually splayed out and flattened to form a hollow neck having a cross sectional area throughout its entire length as great as the minimum cross sectional area of the inner end of the casing, a wide, elongated outlet orifice in the side of the casing, an elongated spigot plug located in the said orifice and having a gas and spirit tight hermetic connection therewith, a diametrically transverse slot extending through the plug and along its length and having a cross sectional area as great as the minimum cross sectional area of the inner end of the casing, and means for rotating the plug so as to deflect the outflowing fluid in any direction within the limits of a wide arc.

6. A tap adapted to effect the functions described comprising, a casing having its outer end gradually splayed out and flattened to form a hollow neck having a cross sectional area throughout its entire length as great as the minimum cross sectional area of the inner end of the casing, an enlarged portion in said casing, a wide, elongated outlet orifice in the enlarged portion, a rotatable coned spigot plug ground into the material forming the sides of the casing adjacent the outlet orifice, the lips of the orifice forming a ground-in hermetic fit with the periphery of the said plug, a diametrically transverse slot extending through and along the length of the plug and having a cross sectional area as great as the minimum cross sectional area of the inner end of the casing, and means for rotating said plug so as to deflect the outflowing fluid in any direction within the limits of a wide arc.

7. A tap adapted to effect the functions described comprising a casing having its outer end gradually widened and deepened to form a hollow neck the minimum interior cross sectional area of which is as great as that of any part of the inner end of the casing and which permits the discharge fluid to impinge permanently on approximately one half of the periphery of a spigot plug, an outlet orifice in the side of the casing, narrow lips extending from the sides of the outlet orifice to the neck of the casing, conical holes provided in the material forming the sides of the neck of the casing, a rotatable, elongated, coned spigot plug ground into said holes in close proximity to the outlet orifice and also against said lips, said lips extending outwardly at the said outlet orifice to approximately the diameter of the spigot plug they embrace so that they form a fluid tight, metal to metal, hermetic seal with the periphery of said spigot plug along their whole length without causing any interference with the full actual discharge, a diametrically transverse slot extending up to the entire length of the periphery of the said spigot plug between the said sides of the neck of the casing, said slot being of a minimum cross sectional area throughout its entire length as great as that of any part of the inner end of the casing and being relatively narrow at one of its ends, and means for adjusting at will said spigot plug so as to positively deflect and then determine the direction of flow of the outflowing fluid within the limits of a wide arc.

In testimony whereof I have signed my name to this specification in the presence of two subscribing witnesses.

WILLIAM EDGAR MUNTZ.

Witnesses:
  N. A. W. SUTER,
  E. C. WALKER.